No. 856,487. PATENTED JUNE 11, 1907.
J. F. OLLRICH.
DREDGER CUTTER.
APPLICATION FILED AUG. 21, 1906.
2 SHEETS—SHEET 1.
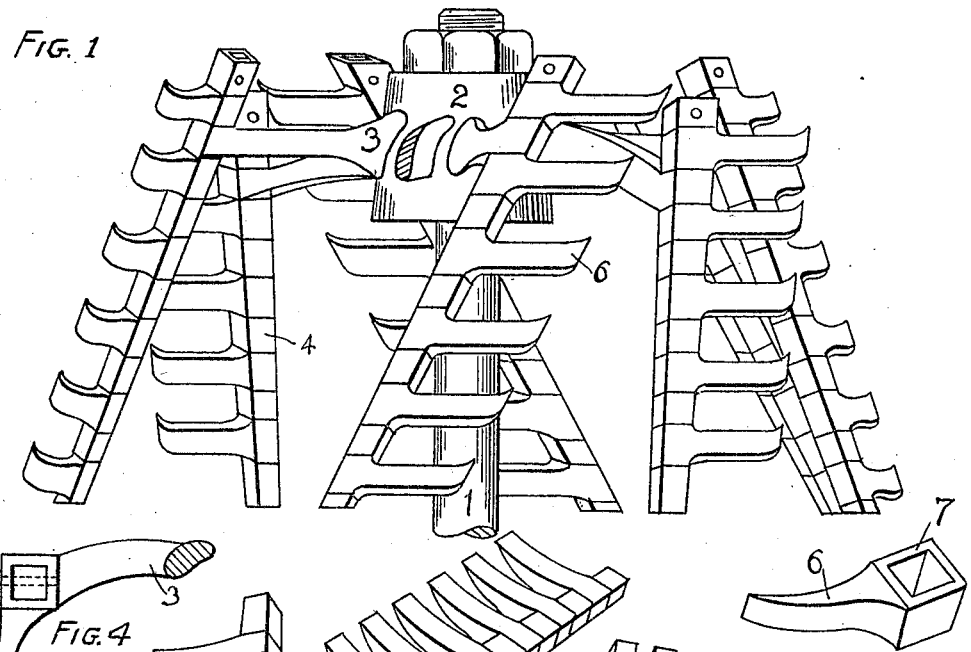
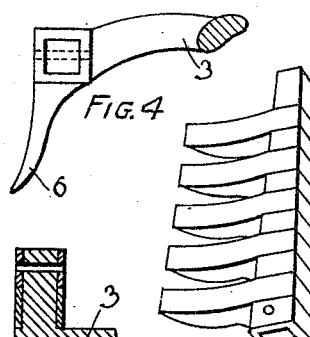
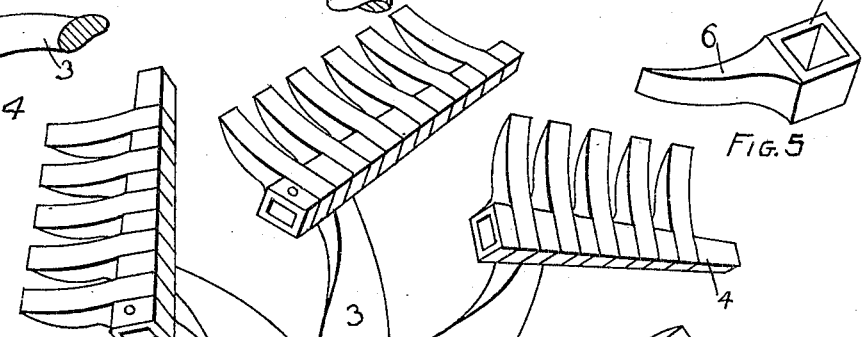
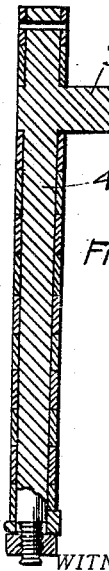
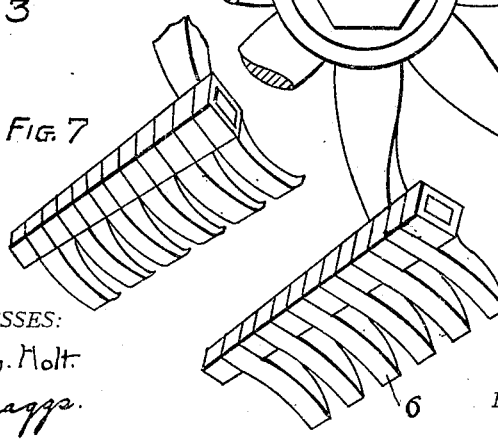
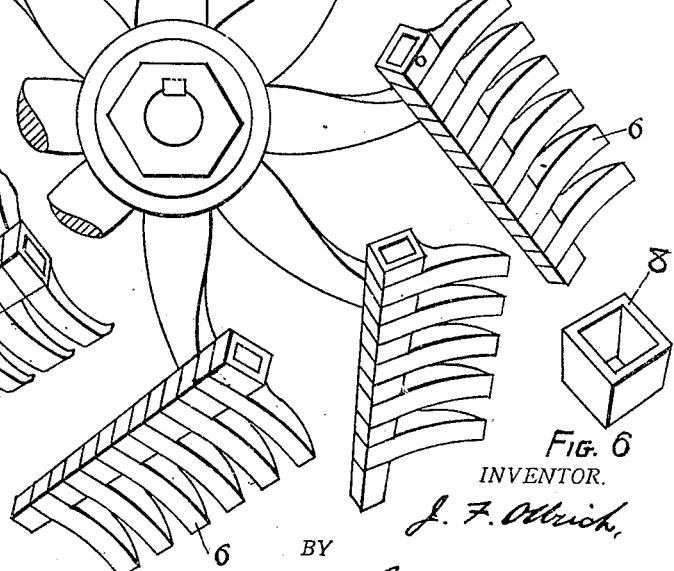
WITNESSES:
Geoffrey Holt.
B. Nagps.
INVENTOR.
J. F. Ollrich,
BY
F. M. Wright,
ATTORNEY.

No. 856,487. PATENTED JUNE 11, 1907.
J. F. OLLRICH.
DREDGER CUTTER.
APPLICATION FILED AUG. 21, 1906.
2 SHEETS—SHEET 2.
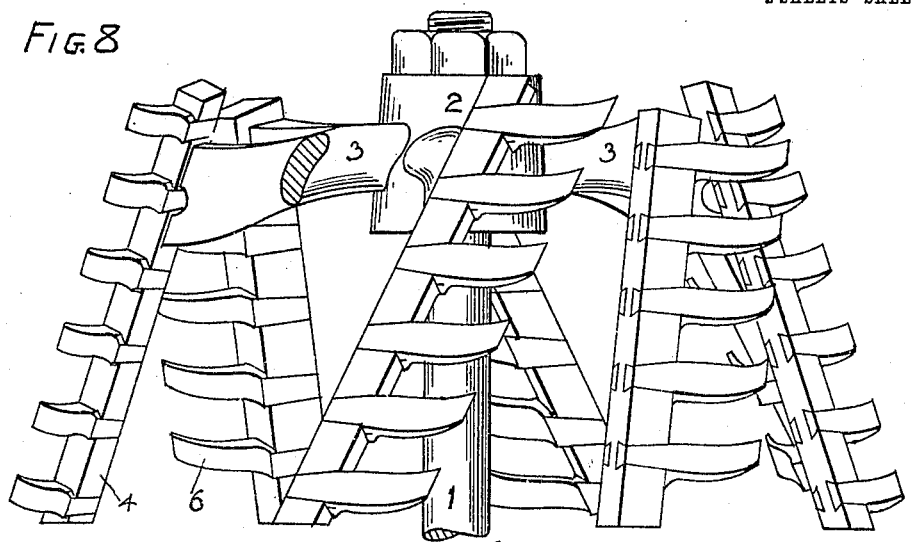
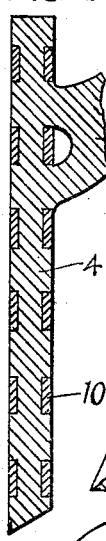
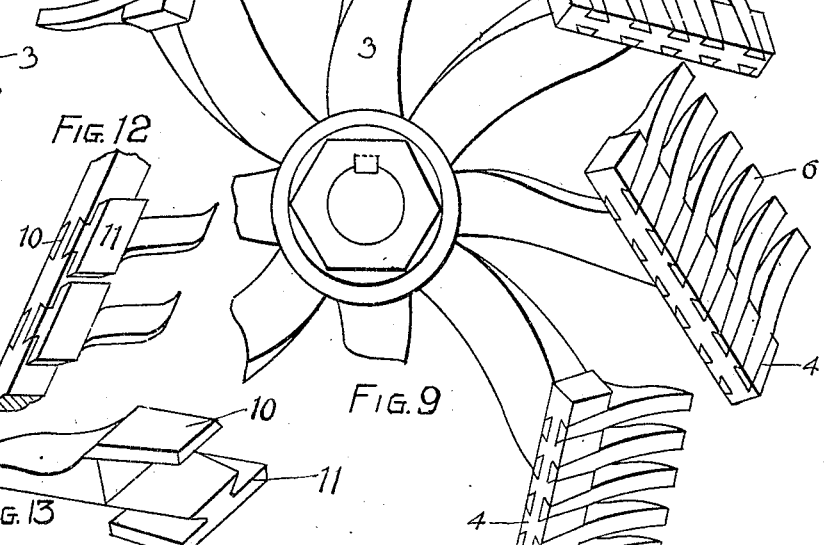
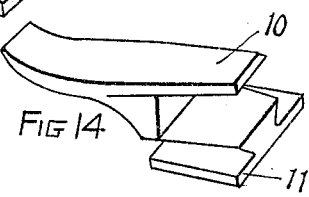
WITNESSES:
INVENTOR.
J. F. Ollrich
BY
ATTORNEY.

UNITED STATES PATENT OFFICE.

JOHN F. OLLRICH, OF SAN FRANCISCO, CALIFORNIA.

DREDGER-CUTTER.

No. 856,487.  Specification of Letters Patent.  Patented June 11, 1907.

Application filed August 21, 1906. Serial No. 331,475.

*To all whom it may concern:*

Be it known that I, JOHN F. OLLRICH, a citizen of the United States, residing at San Francisco, in the county of San Francisco and State of California, have invented new and useful Improvements in Dredger-Cutters, of which the following is a specification.

This invention relates to cutter heads and teeth therefor for dredging machines, the object of the invention being to provide cutter heads and teeth which will be more effective than those heretofore employed, and will be less expensive in repair and maintenance.

In the accompanying drawing, Figure 1 is a side view of one form of my improved cutter head; Fig. 2 is a broken end view thereof; Fig. 3 is an enlarged longitudinal section of one of the bars; Fig. 4 is an end view of one of the bars; Fig. 5 is a perspective view of a tooth; Fig. 6 is a perspective view of a washer; Fig. 7 is a perspective view of a bar showing a modification of the teeth; Fig. 8 is a perspective view of another form of the invention; Fig. 9 is a broken end view of the same; Fig. 10 is a longitudinal section of one of the bars; Fig. 11 is a longitudinal section of a tooth; Fig. 12 is a perspective view of a portion of a bar showing a further modification; Fig. 13 is an enlarged perspective view of the tooth shown therein; Fig. 14 is a similar view of a further modification of the tooth.

Referring to the drawing, 1 indicates the shaft of the cutter head, having secured thereon the hub 2, from which radiate the arms or spokes 3, upon the ends of which are formed the bars 4, all lying in a skew surface of revolutions, that is, in planes oblique to that through the shaft, and also extending farthest outward from the shaft at the end farthest from the hub 2.

The teeth 6 are formed with hollow square bases 7, forming sleeves, which are passed upon the bars, being alternated with square washers 8, the bars themselves being formed square or rectangular in cross section. The square form of these bases prevents the teeth from turning on the bars, and the construction is such as to prevent the teeth falling off and being lost, as is frequently the case with present forms of cutter heads. In Fig. 7, the teeth are curved inward, instead of outward as in Figs. 1 to 6.

In the modification shown in Figs. 8 to 14, the bars are formed with undercut grooves 9, and the bases of the teeth have forks 10, which slide in said grooves and hold them in place. In the forms shown in Figs. 12, 13, and 14, the teeth are also formed with wearing plates 11 which protect the bases of the teeth from wearing too fast.

As will be seen on inspection of Figs. 1 and 8, the teeth on any two adjacent bars alternate, or break ranks, so that each tooth, in its rotation about the main shaft, moves in a path lying midway between the paths of two teeth on the bar in advance of it. Hence the teeth of any bar cut away or score the earth in streaks or grooves spaced from each other, and then the teeth of the next succeeding bar cut upon the earth in the spaces between said streaks. This alternating action produces the best results in excavating the earth.

By reason of the construction whereby the tooth has formed integral therewith parts which overlie the sides of the bar and protect it from wear practically all of the wear is taken up by these overlying parts of the teeth, and the bars undergo no appreciable wear. The teeth, when worn, can be replaced by new ones at very little expense, so that the maintenance and repair of a cutter head of this character is much less than with those heretofore used.

I claim:—

1. A cutter head comprising a shaft, a hub thereon, arms or spokes radiating from said hub, bars extending from the ends of said arms or spokes in planes oblique to that through the shaft, and cutting device having parts formed integral therewith and resting over and in contact with opposite sides of the bar to protect the same from wear, substantially as described.

2. A cutter head comprising a shaft, a hub thereon, arms or spokes radiating from said hub, bars extending from the ends of said arms or spokes in planes oblique to that through the shaft, and cutting device having parts formed integral therewith and resting over and in contact with opposite sides of the bar to protect the same from wear, said parts being also conformed to coact with the bar to secure the cutting device thereon, substantially as described.

3. A cutter head comprising a shaft, a hub thereon, arms or spokes radiating from said hub, bars extending from the ends of said arms or spokes in planes oblique to that through the shaft, and cutting device spaced on the bars, and arranged thereon, so that, on any two adjacent bars, the cutting device alternate or break ranks, substantially as described.

4. A cutter head comprising a shaft, a hub thereon, arms or spokes radiating from said hub, bars extending from the ends of said arms or spokes in planes oblique to that through the shaft, and cutting device having parts formed integral therewith and resting over and in contact with opposite sides of the bar to protect the same from wear, said cutting device being spaced on the bars, and arranged thereon, so that, on any two adjacent bars, the cutting device alternate or break ranks, substantially as described.

5. A cutter head comprising a shaft, a hub thereon, arms or spokes radiating from said hub, bars extending from the ends of said arms or spokes in planes oblique to that through the shaft, and cutting device having parts formed integral therewith and resting over and in contact with opposite sides of the bar to protect the same from wear, said parts being also conformed to coact with the bars to secure the cutting device thereon, said device being spaced on the bars, and arranged thereon, so that, on any two adjacent bars, the device alternate or break ranks, substantially as described.

In testimony whereof I have hereunto set my hand in the presence of two subscribing witnesses.

JOHN F. OLLRICH.

Witnesses:
  F. M. WRIGHT,
  B. NAGGS.